US011972896B2

(12) United States Patent
Ngo et al.

(10) Patent No.: US 11,972,896 B2
(45) Date of Patent: Apr. 30, 2024

(54) COMPACT INDUCTOR EMPLOYING REDISTRIBUTED MAGNETIC FLUX

(71) Applicant: Virginia Tech Intellectual Properties, Inc., Blacksburg, VA (US)

(72) Inventors: Khai Doan The Ngo, Blacksburg, VA (US); Han Cui, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 846 days.

(21) Appl. No.: 17/025,777

(22) Filed: Sep. 18, 2020

(65) Prior Publication Data

US 2021/0035721 A1 Feb. 4, 2021

Related U.S. Application Data

(62) Division of application No. 14/675,653, filed on Mar. 31, 2015, now abandoned.

(60) Provisional application No. 61/973,594, filed on Apr. 1, 2014, provisional application No. 62/140,074, filed on Mar. 30, 2015.

(51) Int. Cl.

| | |
|---|---|
| ***H01F 7/06*** | (2006.01) |
| ***H01F 3/10*** | (2006.01) |
| ***H01F 27/255*** | (2006.01) |
| ***H01F 27/28*** | (2006.01) |
| ***H01F 37/00*** | (2006.01) |
| ***H01F 41/04*** | (2006.01) |

(52) U.S. Cl.

CPC ............ *H01F 3/10* (2013.01); *H01F 27/255* (2013.01); *H01F 27/2823* (2013.01); *H01F 37/00* (2013.01); *H01F 41/04* (2013.01); *H01F 41/041* (2013.01); *Y10T 29/4902* (2015.01)

(58) Field of Classification Search

CPC ...... H01F 27/255; H01F 27/2823; H01F 3/10; H01F 37/00; Y10T 29/4902

See application file for complete search history.

(56) References Cited

U.S. PATENT DOCUMENTS

| | | | |
|---|---|---|---|
| 4,494,100 | A | 1/1985 | Stengel et al. |
| 4,498,067 | A | 2/1985 | Kumokawa et al. |
| 4,603,314 | A | 7/1986 | Fukunaga et al. |
| 4,665,357 | A | 5/1987 | Herbert |
| 4,959,631 | A | 9/1990 | Hasegawa et al. |
| 5,359,315 | A | 10/1994 | Inoue et al. |
| 5,515,022 | A | 5/1996 | Tashiro et al. |
| 6,362,716 | B1 | 3/2002 | Anbo et al. |
| 7,791,165 | B2 | 9/2010 | Tanaka |
| 7,864,013 | B2 | 1/2011 | Muelleman |
| 7,986,207 | B2 | 7/2011 | Shafer et al. |
| 8,232,855 | B2 | 7/2012 | El-Barbari et al. |
| 8,284,010 | B2 | 10/2012 | Tsuji et al. |

(Continued)

*Primary Examiner* — Paul D Kim

(74) *Attorney, Agent, or Firm* — Perilla Knox & Hildebrandt LLP; Stephanie L. Davy-Jow

(57) ABSTRACT

The present invention is directed to a compact inductor having the required (predetermined) inductance and current rating, further designed to avoid substantial heat generation by avoiding saturation, winding(s) possessing a low DC resistance and copper loss, and minimizing the required volume or profile in order to conserve circuit board real-estate. The compact inductor design of the present invention includes both enclosed core as well as enclosed winding type of inductor designs.

7 Claims, 9 Drawing Sheets

(56) References Cited

U.S. PATENT DOCUMENTS

| | | | | |
|---|---|---|---|---|
| 8,327,523 | B2 | 12/2012 | Whitworth et al. | |
| 9,536,660 | B2 * | 1/2017 | Park | H01F 27/255 |
| 11,276,519 | B2 * | 3/2022 | Shinohara | H01F 17/0013 |
| 2013/0249664 | A1 * | 9/2013 | Tonoyama | H01F 17/0013 336/200 |
| 2013/0300529 | A1 * | 11/2013 | Chang | H01F 27/292 336/200 |
| 2016/0035477 | A1 * | 2/2016 | Yeh | H01F 38/14 320/108 |

* cited by examiner

COMPACT INDUCTOR EMPLOYING REDISTRIBUTED MAGNETIC FLUX

PRIORITY CLAIM AND RELATED APPLICATIONS

This divisional application claims the benefit of priority from non-provisional application U.S. Ser. No. 14/675,653 filed on Mar. 31, 2015, now abandoned, provisional application U.S. Ser. No. 61/973,594 filed on Apr. 1, 2014 and provisional application U.S. Ser. No. 62/140,074 filed on Mar. 30, 2015. Each of said applications is incorporated by reference in its entirety.

BACKGROUND OF THE INVENTION

1. The Field of the Invention

This invention generally relates to inductor devices. In a more specific aspect, the present invention is directed to an inductor having a compact design enabled by the redistribution of magnetic flux.

2. Background Art

Power transformers and power inductors are important components of every switching converters or circuits. During the turn-on switching period, the passive components store the energy in the form of magnetic flux, and during the turn-off switching period they transfer the stored energy to the load side. Often the high-frequency Alternating Current (AC) ripple superimposed on the inductor current prevents a substantial portion of the power from being transferred to the load. The core loss includes hysteresis loss and eddy current loss, and higher operation frequency usually results in higher core loss. This power loss is dissipated in the core in the form of heat and sometimes noise (mechanical vibrations). The core loss consists of hysteresis loss and eddy current loss. Typically the higher operation frequency, the higher core losses. Another source of inductor power loss is directed to the inductor's winding(s), commonly called the winding loss. This power loss is primarily due to the resistance of the conductor material (e.g. wire), that comprises the winding; this power loss is dissipated in the winding in the form of heat. A common solution to dealing with inductor heat issues, which include hot spots, include introducing heat sinks, designs that promote air cooling, larger diameter winding wire (to reduce ohmic based power loss), and the like. Further, saturation shall be reduced. Unfortunately, all of the aforementioned solutions result in the creation of an inductor having larger volume which is direct opposition to modern day technology forces, which are driving electrical-electronic circuit toward more compact, efficient, and cost effective type designs. There exists a long felt need to reduce the package size of inductor type devices because these magnetic based components are notorious for consuming large amounts of real-estate on circuit boards.

Known in the electrical or electronic arts are inductive devices, which are passive electrical type devices. Inductive devices also known by other names, including chokes, toroids, coils, or simply inductors. These devices are commonly used on electronic circuits to provide inductance, which is an electrical property that serves as a means for storing electrical energy in a magnetic field. Such devices are typically used in conjunction with time varying or alternating current applications. In general, there are two common types of Inductor designs, the enclosed core and the enclosed winding. The enclosed core type inductor is typically configured using one or more coils or windings which is typically wrapped around a magnetically permeable core. So-called "dual winding" inductors utilize two windings wrapped around a common core. The enclosed winding type of inductor is typically structured having a magnetically permeable type material enveloping the winding(s) portion of the device.

Accordingly, in view of the foregoing present day inductor deficiencies, there exists a clear motivation in the electrical arts for new and useful inductor improvements.

SUMMARY OF THE INVENTION

Passive components, e.g., inductors and capacitors are bulky parts on circuit boards. Researchers in academia, government, and industry have been searching for ways to improve the magnetic energy density and reduce the package size of magnetic parts. The present invention is directed to a compact inductor configured to avoid substantial heat generation by avoiding saturation, reducing the Direct Current (DC) resistance of the winding(s) and copper loss, reducing the required physical volume or profile to conserve circuit board real-estate and increase the inductance of the compact inductor. Thus, there is a demand for uniform distribution of magnetic field and energy in the core without crowding the flux in an inductor.

In accordance with the present invention, there is provided a method of constructing a compact balanced field enclosed winding inductor having a desired inductance $L_o$, a desired resistance $R_o$, at least a first winding window and a second winding window, the method including:

(a) predetermining the uniformity factor $\alpha$ of the balanced field enclosed winding inductor to a minimal value sufficient to maintain the benefit of a balanced field;

(b) determining a plate thickness $H_p$, an outer radius of the first winding window $R_{O1}$, an inner radius of the first winding window $R_{I1}$, and an outer radius of the second winding window $R_{O2}$ simultaneously;

(c) determining the radii of the remaining winding windows of the at least two winding windows recursively, wherein the radii determined are limited by manufacturing constraints;

(d) determining the number of turns $n_j$ of each of the at least two winding windows; and (e) determining the inductance L and resistance $R_{dc}$ of the enclosed winding inductor, wherein if the inductance $R_{dc}$ is not greater or equal to the desired inductance $L_o$ and the resistance is not less than or equal to the desired resistance $R_o$, the uniformity factor $\alpha$ is increased and steps (b)-(e) are repeated.

Accordingly, it is an object of the present invention to provide an inductor capable of meeting operational requirements of the inductor by coming in a smaller package, thereby requiring less space on the circuit board to which the inductor is used.

It is another object of the present invention to provide a method for constructing a compact balanced field enclosed core or enclosed winding inductor.

It is another object of the present invention to provide, in one embodiment, an inductor where previously unused space is populated with magnetic flux-increasing components, thereby maintaining the physical size of the inductor as those of conventional inductors but with increased energy storage.

It is another object of the present invention to provide an inductor having a suitably low resistance that reduces heat issues.

It is another object of the present invention to provide an inductor having no magnetic flux saturation issues, thereby capable of higher energy storage compared to an inductor with such issues within the same inductor size constraints.

It is another object of this invention to provide a relatively simple system that is economical from the viewpoint of the manufacturer and consumer, is susceptible to low manufacturing costs with regard to labor and materials, and which accordingly evokes low prices for the consuming public, thereby making it economically available to the buying public.

Whereas there may be many embodiments of the present invention, each embodiment may meet one or more of the foregoing recited objects in any combination. It is not intended that each embodiment will necessarily meet each objective.

Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

In this respect, before explaining at least one embodiment of the invention in detail, it is to be understood that the invention is not limited in its application to the details of construction and the arrangements of the components set forth in the following description or illustrated in the drawings. The present invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent construction insofar as they do not depart from the spirit and scope of the conception regarded as the present invention.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

Figure 1:
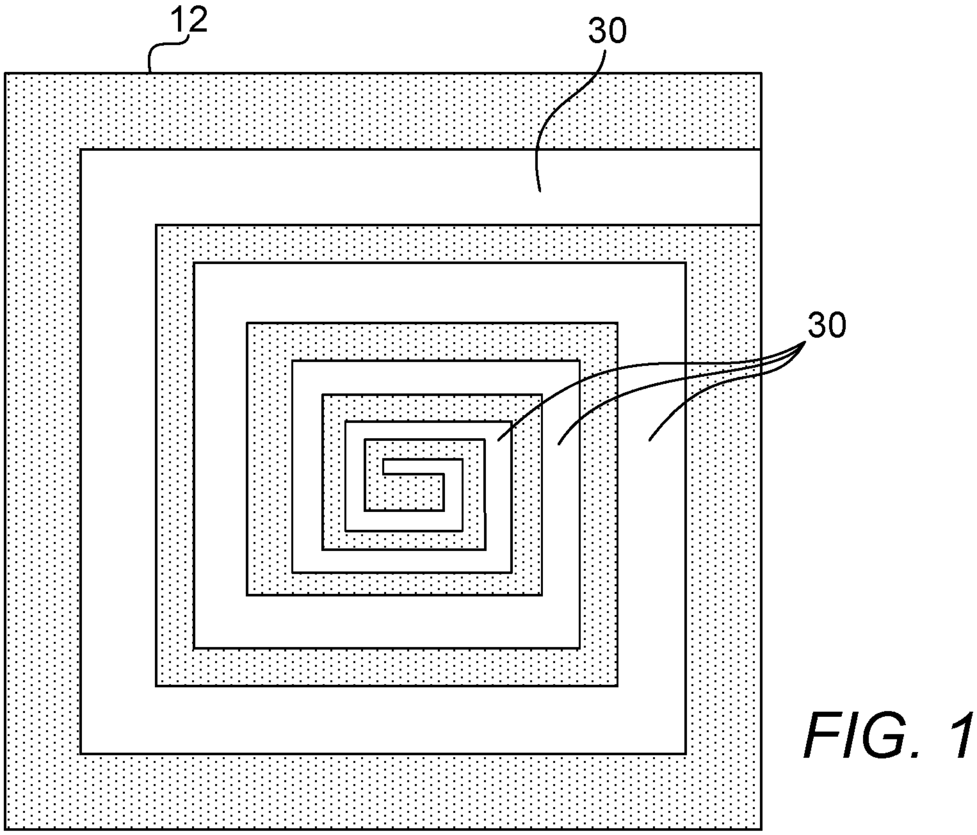
FIG. 1 is a top view of an enclosed-winding inductor according to one embodiment of the present inductor, depicting a core without windings.

2—inductor
4—first core
6—second core
8—third core
10—slotwidth
12—core
14, 14*a*, 14*b*—winding
16—bridge
18—winding over first core
20—winding over second core
22—winding over third core
24—core height Hc
26—window height
28—outer radius of core $R_c$
30—winding window
32—Gaussian surface
34—magnetic flux
36—step of predetermining uniformity factor
38—step of determining the required geometrical parameters $R_O$ and $R_I$ of a core
40—step of determining Ampere-turns on core
42—step of determining the stored energy, inductance and resistance of core
44—step of determining whether the calculated stored energy, inductance and resistance of core meet desired values
46—first end of winding
48—second end of winding
50—ampere loop 1
52—ampere loop 2

54—step of determining $H_p$, $R_{O1}$, $R_{I1}$ and $R_{O2}$ from Equations E2, E4 and E5

56—step of determining all other radii from Equations E4 and E5, within limits of Nw by manufacturing constraints 58—step of determining the number of turns $n_j$ from Equations E7 and E8

60—step of determining inductance L and resistance $R_{dc}$ from Equations E13 and E15 and comparing inductance L with desired inductance $L_o$ and resistance $R_{dc}$ with desired resistance $R_o$

PARTICULAR ADVANTAGES OF THE INVENTION

The present invention provides a relatively simple, cost-effective, efficient solution directed to present day inductor drawbacks such as size and hot spots. The balanced field compact inductor of the present invention will provide the required (predetermined) inductance and current rating. The uniform magnetic field distribution substantially remedies the long felt issues directed to inductor heat generation, core saturation and non-uniform energy density. Enabled are shorter length windings and smaller cross-sectional areas and physical volumes taken up the present inductors and geometries yielding lower DC resistances and copper losses. Additionally, the present invention minimizes the required volume or profile in order to conserve circuit board real-estate. The compact inductor design of the present invention includes both enclosed core as well as enclosed winding type of inductor designs.

DEFINITIONS OF TERMS USED IN THIS SPECIFICATION

The balanced field inductor type devices (i.e., enclosed core, enclosed winding) discussed throughout this disclosure shall have equivalent nomenclature, including the device, the inductor, the system, the present invention, or the invention. Additionally, the term exemplary shall possess a single meaning throughout this disclosure; wherein the sole definition pertains to serving as an example, instance, or illustration.

The term core or magnetic core is defined as a magnetically permeable member having circular, ring like geometry or rectangular, ring like geometry with circular or rectangular cross-sectional shape.

The term winding wire is defined as a conductor comprising the inductor winding, the winding wire can be configured from a variety of wire geometries (i.e., cross-sectional area and cross-sectional area shape). Cross-sectional area shapes include the typical circular configuration, as well as rectangular geometries that possess a relatively lower resistance due to a relatively larger cross-sectional area.

The term "balanced field" or "redistributed flux" shall be used herein to reference uniform magnetic flux, i.e., the amount of magnetic field passing through a surface is uniformly distributed. When the term "balanced field" is used in conjunction with the term "inductor," it modifies the meaning of the term "inductor" to indicate an inductor or components of an inductor with a high uniformity factor $\alpha$ or a low saturation condition.

The term $\alpha$ is defined as the uniformity factor of an inductor.

The term $AT_j$ is defined as the Ampere-turns in winding window j.

The term $B_{max}$ is defined as the maximum flux density achievable in a core.

The term $B_s$ is the saturation flux density of a core.

The term E is defined as the energy stored in a core of an inductor.

The term B is defined as the flux density of a core.

The term H is defined as the magnetic field of an inductor.

The term N is defined as the total number of winding turns.

The term $H_c$ is defined as the height of a core.

The term $H_p$ is defined as the plate thickness between winding and core.

The term $H_w$ is defined as the winding thickness.

The term $I_r$ is defined as the current rating of a winding.

The term L is defined as the inductance of an inductor.

The term $\mu$ is defined as the permeability of a core material.

The term $\mu_o$ is defined as the vacuum permeability.

The term $n_j$ is defined as the number of turns in winding window j.

The term $N_w$ is defined as the number of winding windows.

The term $\rho_{cu}$ is defined as the copper resistivity.

The term $R_c$ is defined as the outer radius of a core.

The term $R_{dc}$ is defined as the DC resistance of an inductor.

The term $R_{Oj}$ is defined as the outer radius of winding window j.

The term $R_{Ij}$ is defined as the inner radius of winding window j.

The term $P_{ohm\_loss}$ is defined as the DC winding loss.

The term V is defined as the effective volume of energy storage.

The term $\tau$ is defined as the time constant ($L/R_{dc}$) of an inductor.

The term $\tau v$ is defined as the time-constant-density ($L/R_{dc}V$) of an inductor.

The term $L_o$ is defined as the desired inductance.

The term $R_o$ is defined as the desired resistance.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

With reference to the drawings of the present invention, several embodiments pertaining to the compact inductor of the present invention thereof will be described. In describing the embodiments illustrated in the drawings, specific terminology will be used for the sake of clarity. However, the invention is not intended to be limited to the specific terms so selected, and it is to be understood that each specific term includes all technical equivalents that operate in a similar manner to accomplish a similar purpose. Terminology of similar import other than the words specifically mentioned above likewise is to be considered as being used for purposes of convenience rather than in any limiting sense.

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", "characterized by", "possessing" and "having" are all to be interpreted as open ended terms, are all considered equivalent terms, and are used interchangeably.

Disclosed herein are two basic types of inductors, i.e., enclosed winding and enclosed core inductors and corresponding embodiment. The primary goal for each embodiment of the present inductor is to achieve high magnetic-energy density by distributing the magnetic flux uniformly, leading to inductor geometries with a volume significantly lower than that of conventional inductors. A relatively uniform flux distribution is advantageous not only from the density standpoint, but also from the thermal standpoint via the reduction of hot spots, and from the reliability standpoint via the suppression of flux crowding. For toroidal inductors of the enclosed core type, adding concentric toroidal cells of magnetic material and distributing the windings properly can successfully make the flux density distribution uniform and thus significantly improve the power density. Compared with a conventional toroidal inductor, the balanced field inductor introduced herein has an enclosed-winding geometry. The winding layout inside the core is configured to distribute the magnetic flux relatively uniformly throughout the magnetic volume to obtain a higher energy density and smaller package volume than those of a conventional toroidal inductor.

The uniformity factor α is defined to reflect the uniformity level inside a core volume. For each given magnetic material and given volume, an optimal uniformity factor exists, which has the highest time constant. The time constant varies with the footprint area, inductor thickness, relative permeability of the magnetic material, and uniformity factor. Therefore, the objective for the balanced field inductor design is to seek the highest possible time constant, so that the balanced field inductor gives a higher inductance and/or lower resistance than conventional inductors of the same volume. In one embodiment, the calculated time-constant-density of the balanced field inductor designed is 4,008 $s/m^3$, which is more than two times larger than the 1,463 $s/m^3$ of a conventional inductor.

Enclosed Winding Inductor

A balanced field enclosed winding inductor includes a distributed winding structure enclosed by a core. The winding structure is configured to distribute magnetic flux in a shaped pattern. The core is made of a magnetic material, e.g., iron powder, and it delineates the footprint area and the total thickness of the inductor. The winding structure typically follows a spiral pattern surrounded by magnetic flux generated by current excitation. The enclosed-winding geometry has the winding structure configured to distribute the magnetic flux into a uniform shape. For a given set of input parameters such as the footprint, thickness of the inductor, permeability of the magnetic material, and highest flux density allowed from the core loss limitation, the radii of each winding window can be determined sequentially according to the uniformity factor selected. After the winding structure is determined, the total energy stored in the core volume and the total DC winding loss can be calculated, and yield the inductance and resistance of the inductor. In one embodiment, a balanced field inductor of a volume of 10×10×2 $mm^3$ for L=1.6 μH, $I_r$=10 A, and $R_{dc}$=7.0 ms) is contrasted to a conventional inductor with comparable electronic ratings (L=1.5 μH, $I_r$=10 A, and $R_{dc}$=8.1 ms)) but occupies 10.3×10.5×4 $mm^3$, i.e., more than two times the volume of the balanced field inductor. The time constant, which is defined as the ratio of inductance to resistance, is an important factor to evaluate the performance of an inductor. A higher time constant suggests higher energy, but with minimum loss within a given volume. The objective of the balanced field inductor is to optimize all the parameters so that the highest time constant can be achieved. Several parameters such as the uniformity factor, the footprint and thickness, the permeability, and the maximum flux density are studied to obtain their relationships with the time constant. For a given volume, an optimized uniformity factor α exists, which has the peak value of the time constant, while different footprints and thicknesses yield different optimal values of a. The time constant increases with increasing volume, since a larger volume provides more space for energy storage. The magnetic properties of the core material is another factor that affects the time constant. At a given volume, the time constant increases proportionally with the permeability, while the maximum flux density has no influence on the time constant at all. Comparisons of the balanced field inductors with the conventional inductors show that the time constant of the balanced field inductors is about 2.5 times higher than that of the conventional inductors at the same volume, or that the volume of the balanced field inductor is two times smaller than that of the commercial product at the same value of time constant because of the better utilization of the magnetic material.

Figure 2:
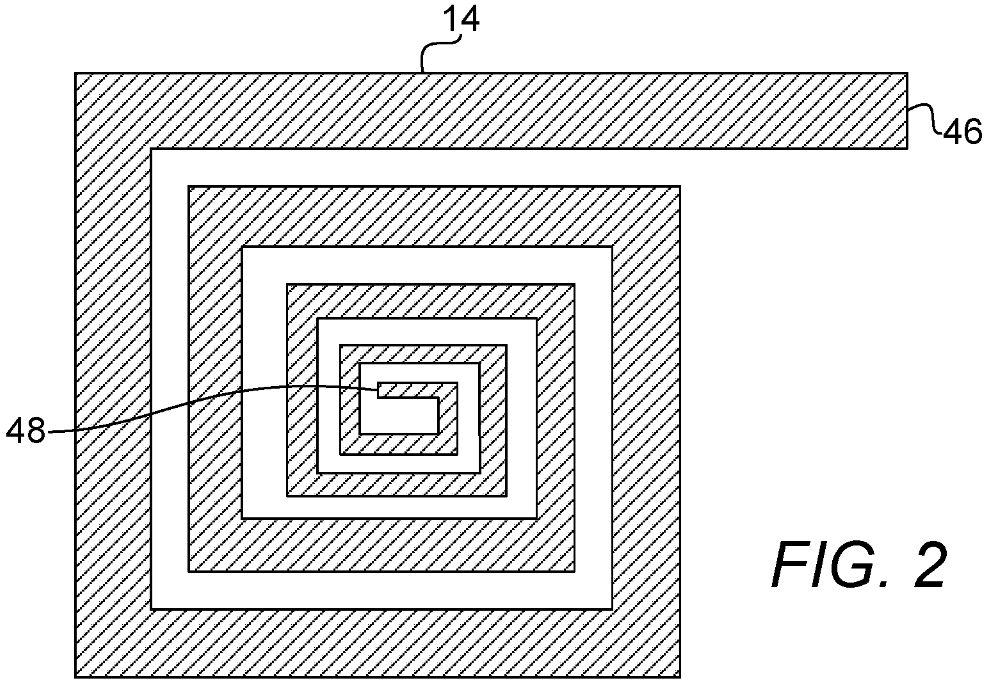
FIG. 2 is a top view of a winding according to one embodiment of the present inductor, depicting the winding configured to be disposed within the core of FIG. 1.
Figure 3:
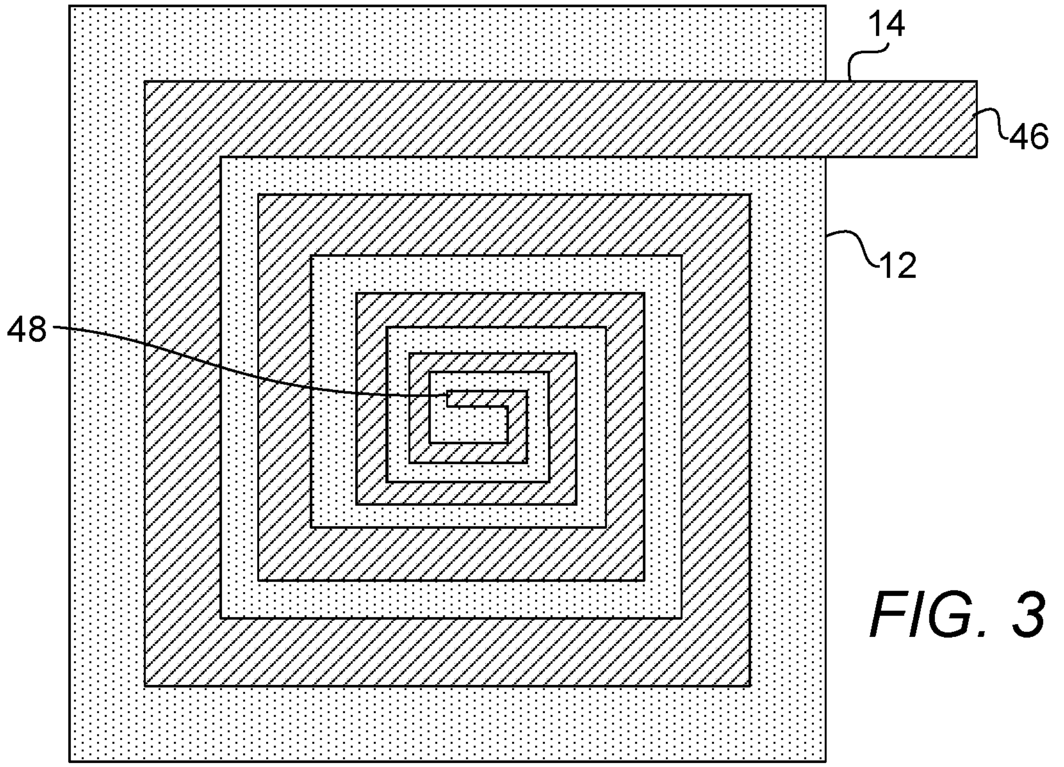
FIG. 3 is a top view showing a winding having been disposed in the winding windows of a core.

FIG. 1 is a top view of an enclosed winding inductor 2 according to one embodiment of the present inductor, depicting a core 12 without a winding 14. A core 12 can be manufactured from a suitable core material provided, in this example, in a rectangular shaped plate, by laser ablation where the non-shaded portions are removed to a suitable depth to result in winding windows 30 to accommodate a winding. FIG. 2 is a top view of a winding 14 according to one embodiment of the present inductor, depicting the winding 14 configured to be disposed within the core 12 shown in FIG. 1. FIG. 3 is a top view showing a winding 14 having been disposed in the winding windows 30 of a core 12.

Figure 4:
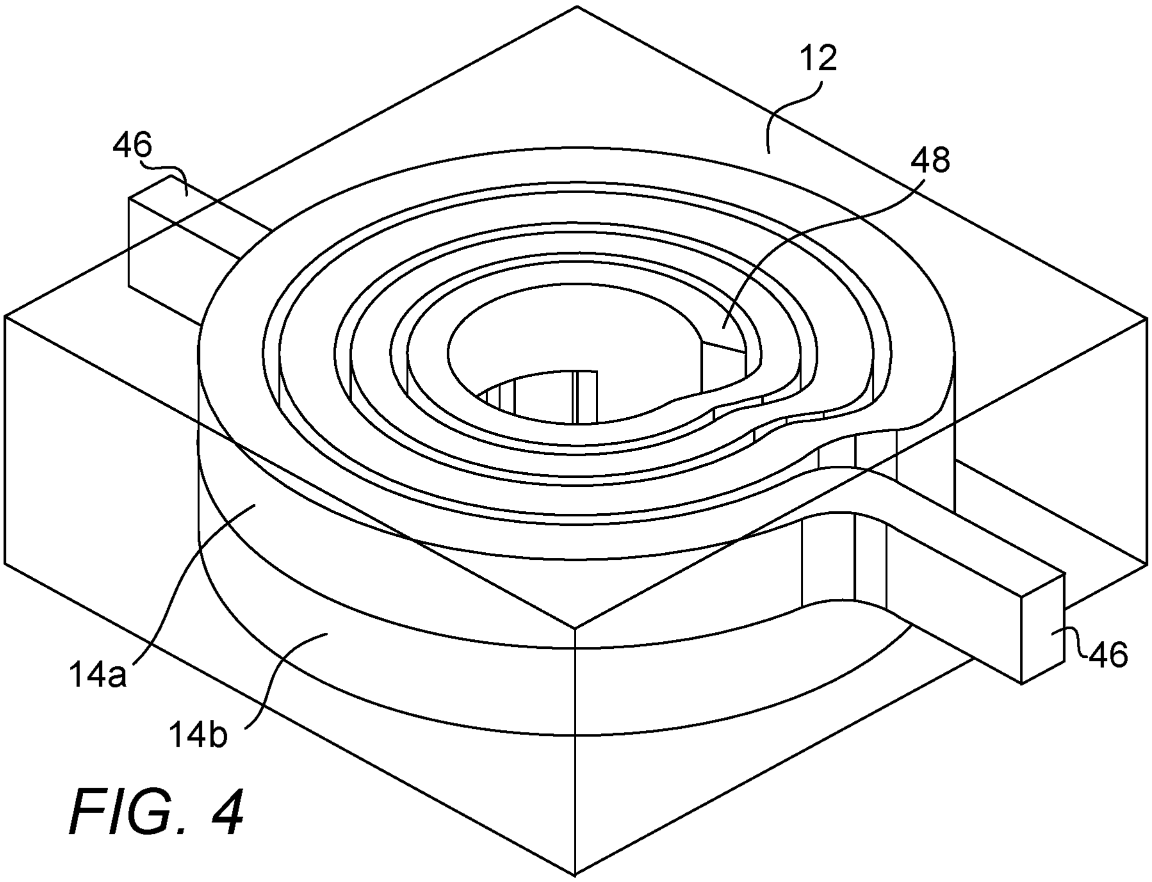
FIG. 4 is a top perspective view of two windings disposed in a core.
Figure 5:
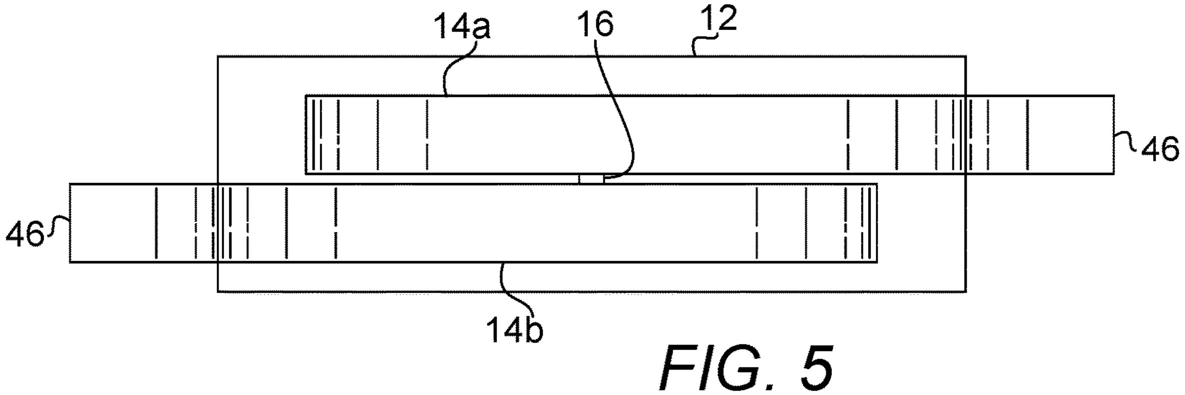
FIG. 5 is a side view of two windings disposed in a core.

FIG. 4 is a top perspective view of two windings 14*a* and 14*b* disposed in a core 12. FIGS. 1-3 depict a winding 14 formed in a rectangular manner. FIG. 5 is a side view of two windings 14 disposed in a core 12. FIG. 4 depicts two windings 14, each having a terminal at a first end 46 and a second end 48 at which a second winding 14 can be electrically connected via a bridge 16. It shall be noted that the winding 14 disposed on the top winding 14 is configured to spiral in clockwise direction (as viewed from the top) toward the center, connects to the second end of the bottom winding 14, also at its second end 48 via bridge 16. The second winding 14 continues to spiral in clockwise direction (as viewed from the top) to a bottom terminal at the first end 46 of the bottom winding 14. In one embodiment, the vertical spacing between adjacent windings is kept at no less than about 0.2 mm. The core may be a composite of two halves connected in their medial position. The core may also be a core similar to that shown in FIG. 1, but instead configured in the shape and size of the corresponding windings and configured to accommodate not one but two windings. It shall also be noted that the windings 14*a*, 14*b*, of FIG. 4 may be configured in a circular manner having a winding cross-sectional shape of a rectangle.

Figure 5A:
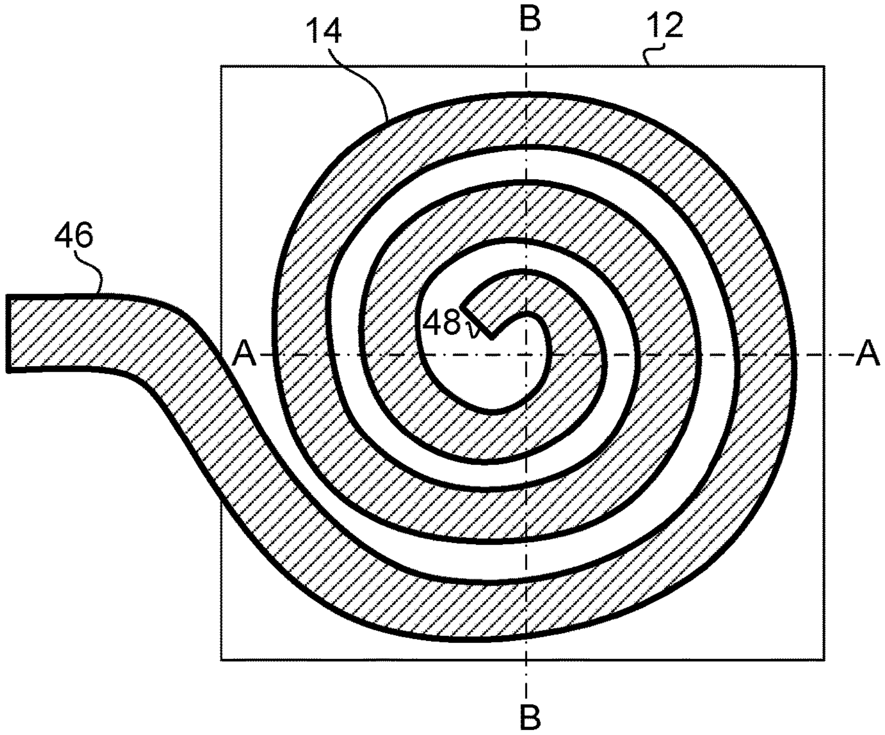
FIG. 5A is a top view of one winding disposed in a core.
Figure 6:
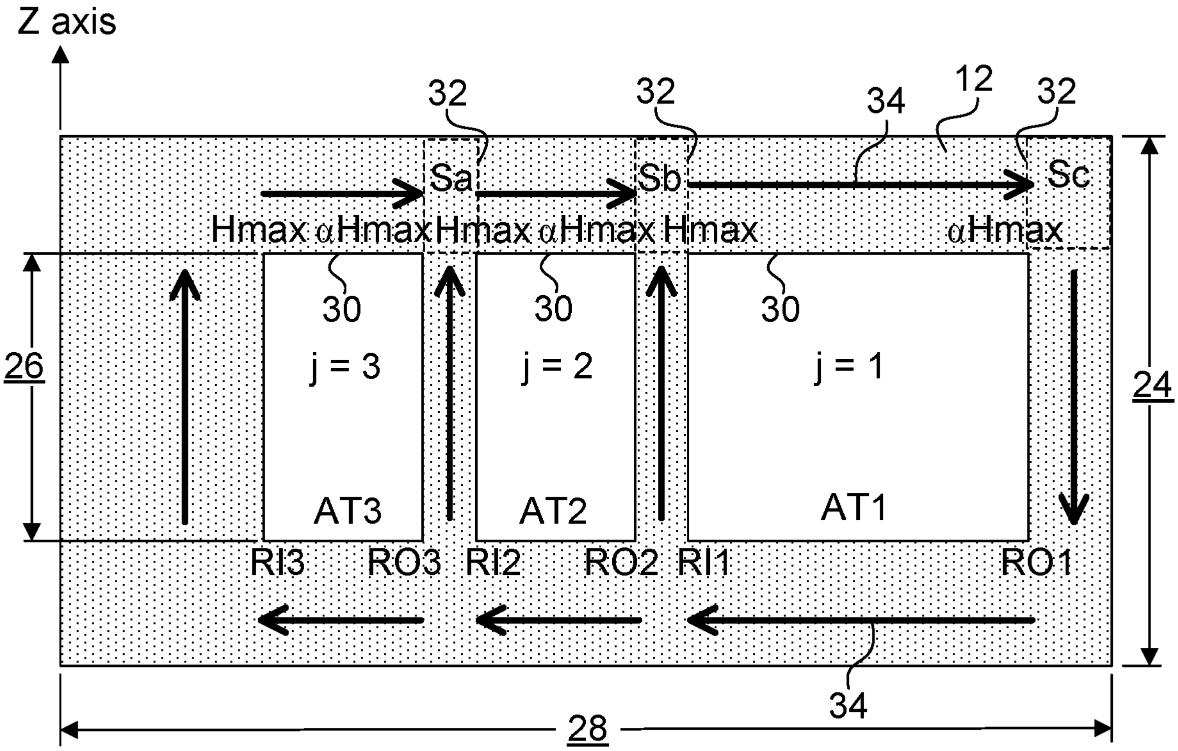
FIG. 6 is an axisymmetric view of an enclosed-winding inductor showing three winding windows, ampere-turn direction, and magnetic flux path.

FIG. 5A is a top view of one winding disposed in a core. FIG. 6 is an axisymmetric view of an enclosed winding inductor showing three winding windows 30, ampere-turn direction, and magnetic flux 34 path as a result of viewing the upper right section of the core 12 as taken along lines AA and BB of FIG. 5A with a line of sight perpendicular to line AA. Referring to FIG. 6, an enclosed-winding inductor 2 includes a magnetic core 12 with a plurality of winding windows 30, each denoted by the letter j. For convenience, the winding windows 30 are numbered from the outer edge of the core to the center of the core. Each winding window carries a prescribed number of ampere-turns $AT_j$ in winding window j to ensure uniformity of the flux distribution throughout the core volume.

The outer and inner radius of each winding window j is denoted by $R_{Oj}$ and $R_{Ij}$ respectively. For a given footprint diameter or $2*R_c$ and total inductor/core height of 24 or $H_c$, the objective of the balanced field design is to optimize the radii of the winding windows, as well as the ampere-turns in each winding window 30, to distribute the magnetic flux as uniformly as possible.

For a given core loss density and frequency of operation, the maximum magnetic flux density $B_{max}$ can be determined from the magnetic properties of the material. The magnetic field around winding window j is allowed to drop from a maximum value $B_{max}$ to a minimum value $\alpha B_{max}$, where α=uniformity factor and α<1. "Balanced field" flux is achieved when the uniformity factor α approaches unity, implying uniform flux density everywhere throughout the core volume.

FIG. 6 depicts an inductor with three winding windows. In one embodiment, an inductor having two halves, each having the specifications as follows was tested:

Winding window j=1, $R_{Oj}$=4.8 mm, $R_{Ij}$=3.8 mm,
Winding window j=2, $R_{Oj}$=3.6 mm, $R_{Ij}$=2.9 mm,
Winding window j=3, $R_{Oj}$=2.7 mm, $R_{Ij}$=1.9 mm,
Winding window j=4, $R_{Oj}$=1.5 mm, $R_{Ij}$=1.0 mm,
Thickness of winding=0.5 mm,
Height of an inductor half $H_c$=1.0 mm
Footprint of an inductor half=10 mm×10 mm
Winding cross-sectional shape=square
Inductance=1.53 μH
Winding resistance=7.3 mΩ

In order to find the saturation current of the inductor designed, a current of 8 A-38 A is applied to the inductor. With an assumed 0.9 T saturation flux density, the inductance dropped by 20% when the applied current is about 32 A. Therefore, the saturation current is found to be about 32 A. Compared to a comparable conventional inductor, the present inductor yields a saturation current that is improved by 18% due to the uniformity of the flux distribution.

Figure 14:
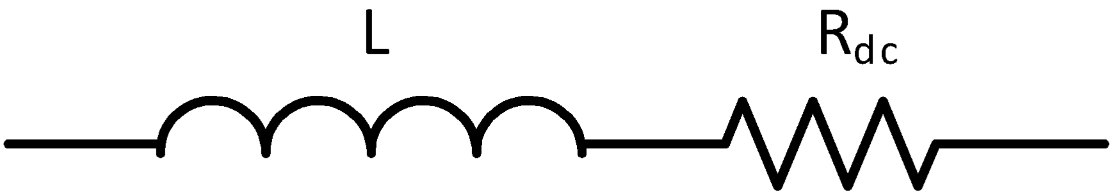
FIG. 14 depicts an equivalent circuit of an inductor.

An inductor can be considered as a RL circuit, which has an ideal inductor in series with a wire resistor, as shown in FIG. 14. The time constant τ of a series RL circuit is defined as the inductance divided by the resistance as shown in equation E1 where L=inductance of inductor and $R_{dc}$=DC resistance of inductor.

$$\tau = \frac{L}{R_{dc}} \qquad \text{Equation E1}$$

In the balanced field inductor design, the time constant is employed to represent the ratio of the inductance to DC resistance. It shall be noted that at a given inductance, the DC winding resistance decreases with an increasing time constant, thereby decreasing the DC loss due to $R_{dc}$.

The flux density is at its maximum value $B_{max}$ at the inner radius of each winding window, and drops by a factor of α along both the radial and vertical directions. Along the vertical edges of the winding windows, the flux density is assumed to be constant. Based on Gauss' law, the amount of flux that flows into a surface equals to the amount of flux that flows out of the surface. Therefore, the behavioral model of the balanced field inductor can be derived based on the Gaussian surfaces defined at different locations. In the case of winding window j=1, the equation for Gaussian Surface Sc can be written as equation E2.

$$2\pi R_{o1} H_p \frac{(\alpha+\alpha^2)B_{max}}{2} = \pi(R_c^2 - R_{o1}^2)\frac{(\alpha+\alpha^2)B_{max}}{2} \qquad \text{Equation E2}$$

$$\text{or } R_{o1}^2 + 2R_{o1}H_p - R_c^2 = 0$$

where Hp is the plate thickness 24, α=uniformity factor, $B_{max}$=maximum flux density, $R_c$=outer radius of core 28, $R_O$=outer radius of winding window and $R_I$=inner radius of winding window.

Based on the simplified equation E2 and given $H_p$ and $R_c$ due to physical constraints or desired size limitations governing the core to be made, the outer radius $R_{O1}$ of winding window j=1 is thus determined. The plate thickness between winding and core $H_p$ is related to the winding thickness $H_w$ by equation E3.

$$H_p = \frac{1}{2}(H_c - H_w) \qquad \text{Equation E3}$$

For the Gaussian surfaces, e.g., $S_a$, the flux flows from the inner radius to the outer radius of winding window j. For each winding window, the ratio of outer radius to the inner radius is related to the magnetic flux density as shown in equation E4.

$$\frac{R_{Oj}}{R_{Ij}} = \frac{B_{max}}{\alpha B_{max}} = \frac{1}{\alpha},\ 1 \le j \le N_w \qquad \text{Equation E4}$$

Where $N_w$=number of winding windows, $B_{max}$=maximum flux density, j=winding window, $R_{Oj}$=outer radius of winding window j, $R_{Ij}$=inner radius of winding window j and α=uniformity factor.

Thus, $R_{I1}$ can be determined once $R_{O1}$ is known, and $R_{Ij}$ can be obtained recursively from $R_{Oj}$. Based on the Gaussian surface $S_b$ defined in FIG. 6, equation E5 yields recursively the outer radius of winding window j>1:

$$\frac{\alpha+\alpha^2}{2}B_{max}2\pi R_{O(j+1)}H_p + \frac{1+\alpha}{2}B_{max}\pi(R_{Ij}^2 - R_{O(j+1)}^2) = \frac{1+\alpha}{2}B_{max}2\pi R_{Ij}H_p \qquad \text{Equation E5}$$

$$\text{or } R_{O(j+1)}^2 - 2\alpha R_{O(j+1)}H_p + 2R_{Ij}H_p - R_{Ij}^2 = 0,\ 1 \le j \le N_w$$

where α=uniformity factor, $H_p$=plate thickness between winding and core, $B_{max}$=maximum flux density, j=first core, (j+1)=second core, $R_{O(j+1)}$=outer radius of winding window (j+1), $R_{I(j+1)}$=inner radius of winding window (j+1) and $R_c$=outer radius of first core.

When $H_p$ is not known, e.g., when the plate thickness to be used is to be determined, $H_p$ can be calculated based on the Ampere's law. As shown in FIG. 6, from the winding to the edge of the core, the flux density is regulated to drop by a factor of α vertically. Therefore, based on Ampere's law, the ampere-loop that covers the same winding window should have equal ampere-turns, and equation E6 can be added to solve the plate thickness between the winding and the core:

$$\int_{l_1} H \cdot dl_1 = \int_{l_2} \alpha H \cdot dl_2 \quad \text{Equation E6}$$

$$H_w \cdot (1+\alpha) + 2 \cdot R_{Ij} \cdot \ln\left(\frac{R_{Oj}}{R_{Ij}}\right) = \alpha \cdot (H_w + 2H_p)(1+\alpha) + 2 \cdot \alpha \cdot R_{O2} \cdot \ln\left(\frac{R_c}{R_{O2}}\right)$$

where H=magnetic field, α=uniformity factor, $H_w$=winding thickness, $H_p$=plate thickness between winding and core, j=winding window, $R_{Oj}$=outer radius of winding window j, $R_{Ij}$=inner radius of winding window j, $R_c$=outer radius of core.

By simultaneously solving equation E6 with equations E2 to E5, the plate thickness $H_p$ and the radii of all the winding windows can be derived recursively. Note that once $H_p$ is determined from the outermost winding window, the value can be assumed to remain constant for other winding windows for simplification. Ideally, each winding window j has a calculated $H_p$ from equation E6, and the larger the j, the larger the $H_p$.

Figure 7:
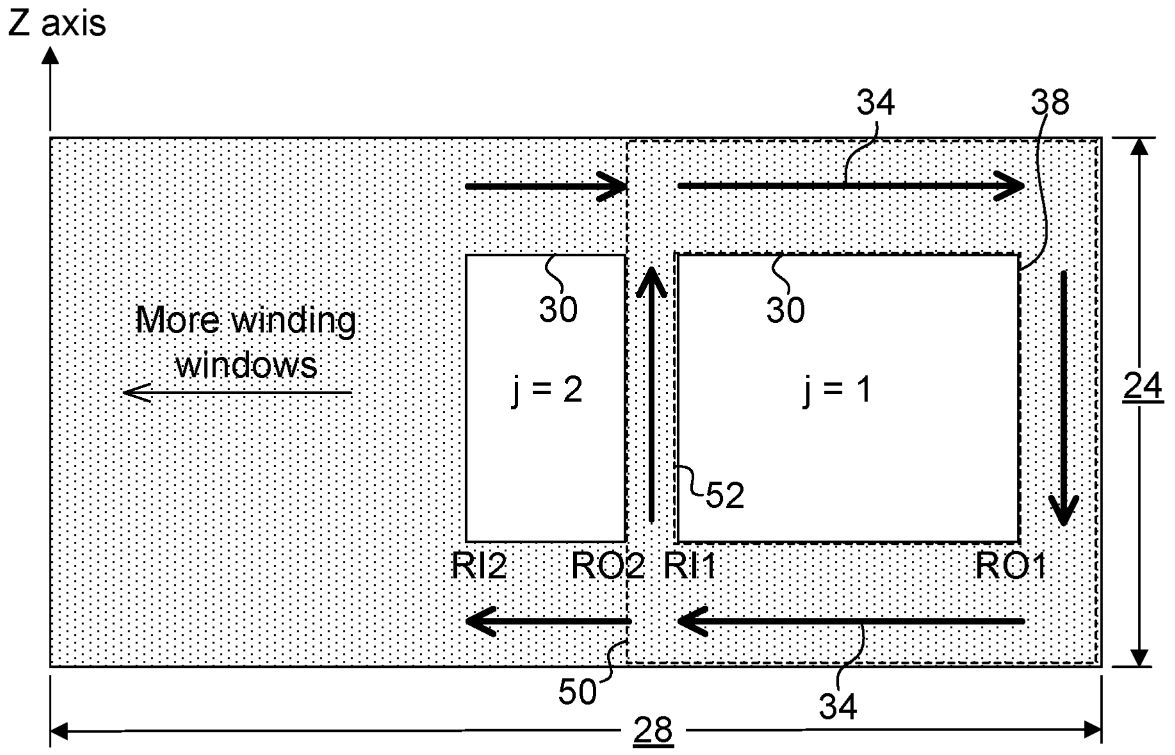
FIG. 7 is an axisymmetric view of a balanced field inductor showing the flux drop on the vertical direction by a factor of α, ampere loops around winding window 1, and magnetic flux path.

FIG. 7 is an axisymmetric view of a balanced field inductor showing the flux drop on the vertical direction by a factor of α, ampere loops around winding window 1, and magnetic flux path.

In order to calculate the Ampere-turns that should be applied to winding window j, the Ampere-loop 1 (part 50) in FIG. 7 is drawn on every winding window. Based on Ampere's law, Ampere-turn $AT_j$ is assigned to winding window j as shown in equation E7.

$$AT_j = H_w \cdot \left(\frac{B_{max}}{\mu} \pm \frac{\alpha B_{max}}{\mu}\right) + 2 \cdot \frac{B_{max}}{\mu} \cdot R_{Ij} \cdot \ln\left(\frac{R_{Oj}}{R_{Ij}}\right) \quad \text{Equation E7}$$

Where j=winding window, $AT_j$=Ampere-turns in winding window j, $H_w$=winding thickness, $B_{max}$=maximum flux density, μ=permeability of core material, $R_{Oj}$=outer radius of winding window j, $R_{Ij}$=inner radius of winding window j.

The number of turns in winding window j is determined using $AT_j$ and the rated current $I_r$ as shown in equation E8.

$$n_j = \frac{AT_j}{I_r} \quad \text{Equation E8}$$

Where j=winding window, $n_j$=number of turns in winding window j, $AT_j$=Ampere-turns in winding window j and $I_r$=current rating.

Therefore, the total number of turns is the sum of the number of turns in each winding window as shown in Equation E9.

$$N = \sum_{j=1}^{N_w} n_j = \sum_{j=1}^{N_w} \frac{AT_j}{I_r} \quad \text{Equation E9}$$

Where N=total number of winding turns, j=winding window, $N_w$=number of winding windows, $n_j$=number of turns in winding window j, $AT_j$=Ampere turns in winding window j and $I_r$=current rating.

After all the radii and plate thickness are derived, the structure of the inductor is determined. The energy stored in the inductor can be calculated by integrating the flux density throughout the total core volume as shown in equation E10.

$$E \approx \frac{1}{2\mu}\left(\frac{B_{max} + \alpha B_{max}}{2}\right)^2 \pi\left(R_c^2 H_c - H_w \sum_{1}^{N_w} R_{Oj}^2 - R_{Ij}^2\right) \quad \text{Equation E10}$$

where $H_c$=core height, $H_w$=winding thickness, μ=permeability of core material, $B_{max}$=maximum flux density, α=uniformity factor, j=winding window, $R_{Oj}$=outer radius of winding window j, $R_{Ij}$=inner radius of winding window j, $R_c$=outer radius of core and $N_w$=number of winding windows.

The small-signal inductance can be derived as follows:

$$I_r^2 = \frac{1}{N^2}\left(\sum_{j=1}^{N_w} AT_j\right)^2 \quad \text{Equation E11}$$

Where $I_r$=current rating, N=total number of winding turns, j=winding window, $AT_j$=Ampere-turns in winding window j and $N_w$=number of winding windows.

$$I_r^2 = \frac{B_{max}^2}{\mu^2 N^2}\left[\sum_{j=1}^{N_w}\left(H_w(1 \pm \alpha) + 2R_{Ij} \cdot \ln\left(\frac{R_{oj}}{R_{Ij}}\right)\right)\right]^2 \quad \text{Equation E12}$$

Where $I_r$=current rating, $B_{max}$=maximum flux density, μ=permeability of core material, N=total number of winding turns, $N_w$=number of winding windows, $H_w$=thickness of the winding, α=uniformity factor, j=winding window, $R_{Ij}$=inner radius of winding window j and $R_{Oj}$=outer radius of winding window j.

$$L = \frac{2E}{I_r^2} \quad \text{Equation E13}$$

Where L=inductance of inductor, E=energy stored in core and $I_r$=current rating.

$$L = \frac{\mu N^2 \cdot \left(\frac{1+\alpha}{2}\right)^2 \cdot \pi\left(R_c^2 H_c - H_w \sum_{1}^{N_w} R_{Oj}^2 - R_{Ij}^2\right)}{\left[\sum_{j=1}^{N_w}\left(H_w \cdot (1 \pm \alpha) + 2 \cdot R_{Ij} \cdot \ln\left(\frac{R_{Oj}}{R_{Ij}}\right)\right)\right]^2} \quad \text{Equation E14}$$

where L=inductance of inductor, $H_c$=core height, $H_w$=winding thickness, μ=permeability of core material, $B_{max}$=maximum flux density, α=uniformity factor, j=winding window, $R_{Oj}$=outer radius of winding window j, $R_{Ij}$=inner radius of winding window j, $N_w$=number of winding windows, $R_c$=outer radius of core and N=total number of winding turns.

The ideal DC resistance $R_{dc}$ is obtained from equation E15.

$$R_{dc} = \frac{\rho_{cu} \cdot 2\pi}{H_w \ln(1/\alpha)} \cdot \sum_{j=1}^{N_w} n_j^2 \quad \text{Equation E15}$$

where $\rho_{cu}$=copper resistivity, $H_w$=thickness of the winding, $\alpha$=uniformity factor, j=winding window, $N_w$=number of winding windows, $n_j$=number of turns in winding window j and $R_{dc}$=DC resistance of inductor.

Figure 15:
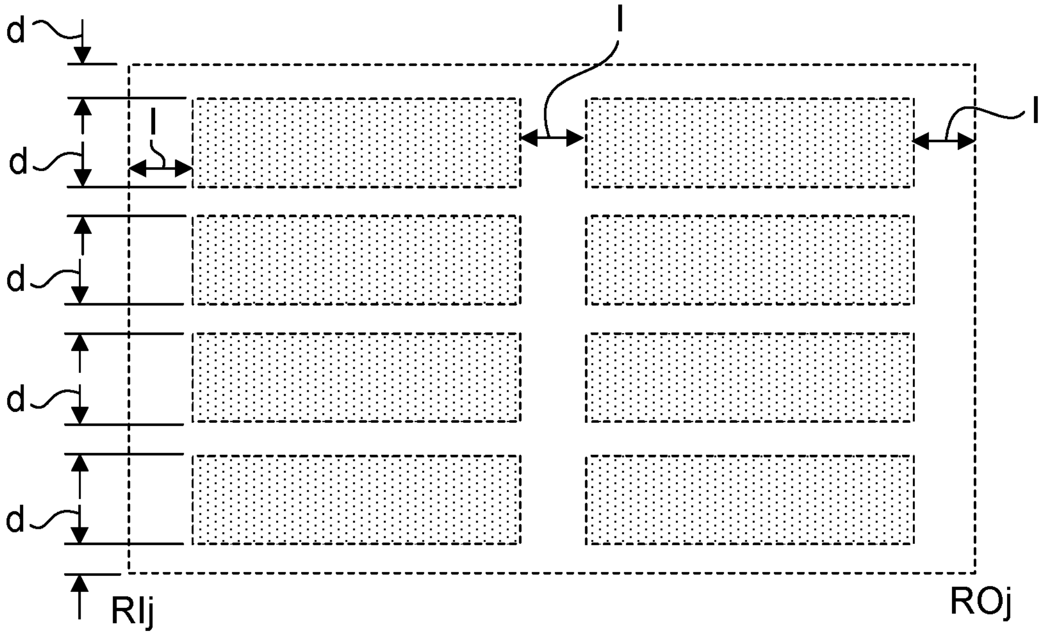
FIG. 15 depicts an example of modified structure of winding window j after considering the fabrication clearance on the horizontal and vertical direction where m=3=the number of clearance spacing on the horizontal direction, n=5=the number of clearance spacing on the vertical direction.

Based on the number of turns calculated from equation E8, each winding window can be divided into different number of turns. FIG. 15 depicts an example of dividing the winding window j (with radius $R_{Ij}$ and $R_{Oj}$) into eight turns, with spacing of l and d between the turns horizontally and vertically. The values of l and d depends on the winding configuration and fabrication clearance. Assume the total clearance is ml horizontally and nd vertically, then the effective radius becomes equation E16 where m=the number of clearance spacing on the horizontal direction, n=the number of clearance spacing on the vertical direction.

$$R'_{Ij} = R_{Ij} + \frac{\text{ml}}{2} \quad \text{Equation E16}$$

$$R'_{oj} = R_{oj} - \frac{\text{ml}}{2}$$

Where $R_{Ij}$=inner radius of winding window j and $R_{Oj}$=outer radius of winding window j.

The effective factor $\alpha$ is calculated as in equation E17.

$$\alpha_j = \frac{R'_{Ij}}{R'_{oj}} = \frac{R_{Ij} + \text{ml}/2}{R_{oj} - \text{ml}/2} \quad \text{Equation E17}$$

Where $R_{Ij}$=inner radius of winding window j and $R_{Oj}$=outer radius of winding window j.

The effective winding thickness of winding window j becomes equation E18.

$$H_{w\_e} = H_w - nd \quad \text{Equation E18:}$$

Where $H_{w\_e}$=effective winding thickness and $H_w$=winding thickness.

Therefore, equation E15 can be modified to calculate the practical resistance as shown in equation E19:

$$R_{dc} \approx \frac{\rho_{cu} \cdot 2\pi}{H_{w\_e}} \cdot \sum_{j=1}^{N_w} \left( \frac{n_j^2}{\ln(1/\alpha_j)} \right) \quad \text{Equation E19}$$

Referring back to equation E1, the time constant $\tau$ can then be calculated where L and $R_{dc}$ can be found in equations E14 and E15. In order to validate the concept of balanced field inductor, various ways of fabrication for the core and the winding were explored, including the routing process, laser process on the core, etching technique on copper, and screen printing with silver paste. The most successful results were obtained from the routing process on both the core and the winding. In one embodiment, a Micrometals® core having a relative permeability of about 22 and a winding made of copper sheets of about 0.5 mm thick are used. The fabricated inductor prototype shows a significant improvement in energy density: at the same inductance and resistance, the volume of the balanced field inductor is about two times smaller than that of comparable a conventional inductor.

Figure 8:
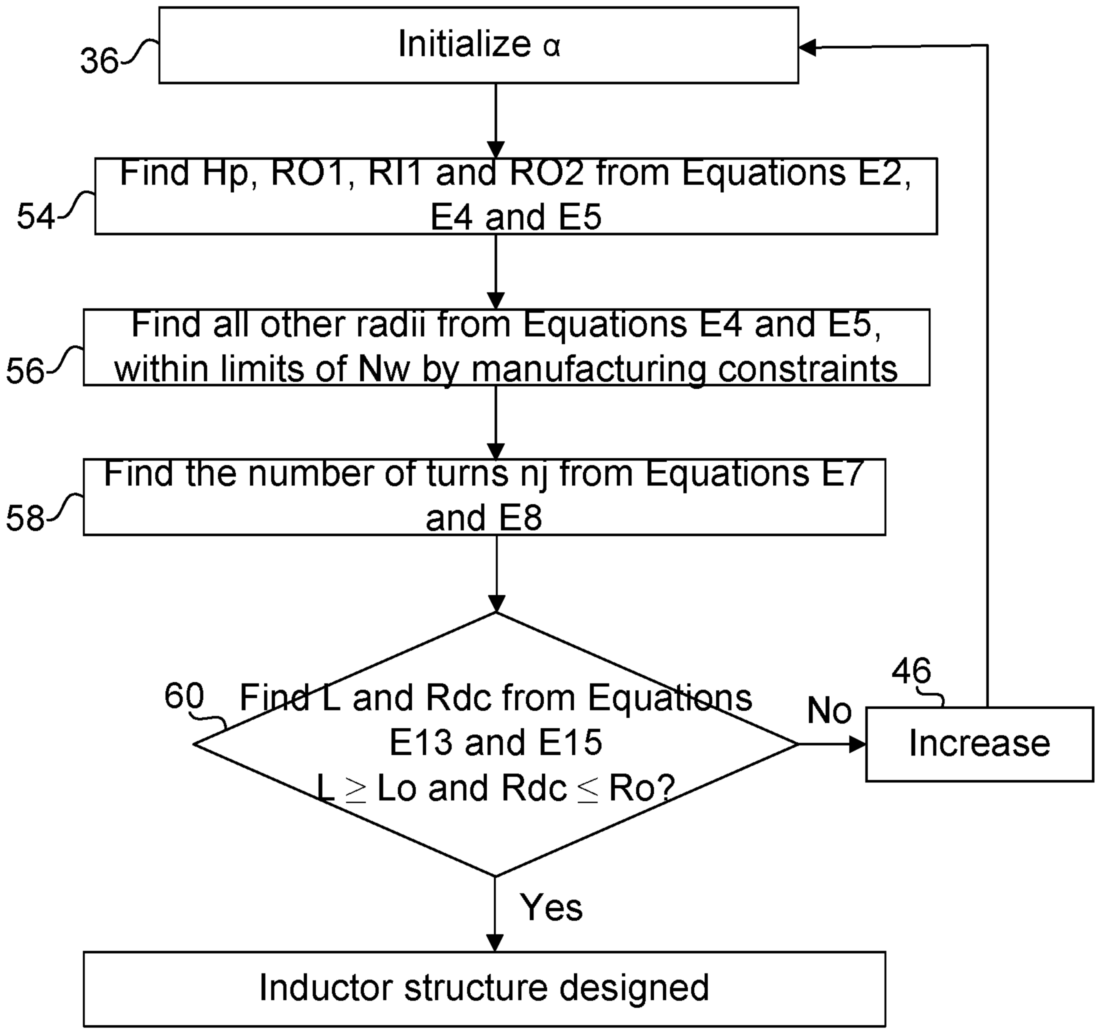
FIG. 8 is a flowchart depicting the steps by which the enclosed winding type of the present inductor is configured.

FIG. 8 is a flowchart depicting the steps by which the enclosed core type of the present inductor is configured. The electrical inputs to the design include target inductance $L_o$, rated current $I_r$, and target DC resistance $R_o$. The magnetic inputs include maximum magnetic flux density $B_{max}$ and permeability $\mu$. The mechanical inputs include the footprint radius $R_c$ and inductor height $H_c$. The uniformity factor $\alpha$ is swept and all design variables are calculated until the required or desired inductance $L_o$ and dc resistance $R_o$ are met. Step 36 shows the first step where the uniformity factor $\alpha$ is initialized to be 0.5, which is the minimal value to maintain the benefit of a balanced field. Then in step 54, the plate thickness $H_p$, radius $R_{O1}$, $R_{I1}$, and $R_{O2}$ can be calculated by solving Equations E2, E4 and E5 simultaneously. After $H_p$ has been determined, the radii of the remaining winding windows can be obtained recursively as shown in step 56. It shall be noted that the total number of winding windows $N_w$ is limited by the manufacturing constraints such as the width of the winding and the distance between the winding and the center of the core. The number of turns $n_j$ is then determined as shown in step 58 before the inductance L and resistance $R_{dc}$ are determined from Equations E13 and E15 as shown in step 60. If the requirements cannot be met or if the inductance is not greater or equal to the desired inductance $L_o$ and the resistance is not less than or equal to the desired resistance $R_o$, the uniformity factor $\alpha$ is increased as in step 46 and the process is repeated. If no uniformity factor $\alpha$ gives a satisfied inductance and resistance, increase the dimension of the core $R_c$ and/or $H_c$ and repeat the procedure. If the calculated inductance and resistance are both better than the target, the inductor volume can be further reduced.

Enclosed Core Inductor

Figure 9:
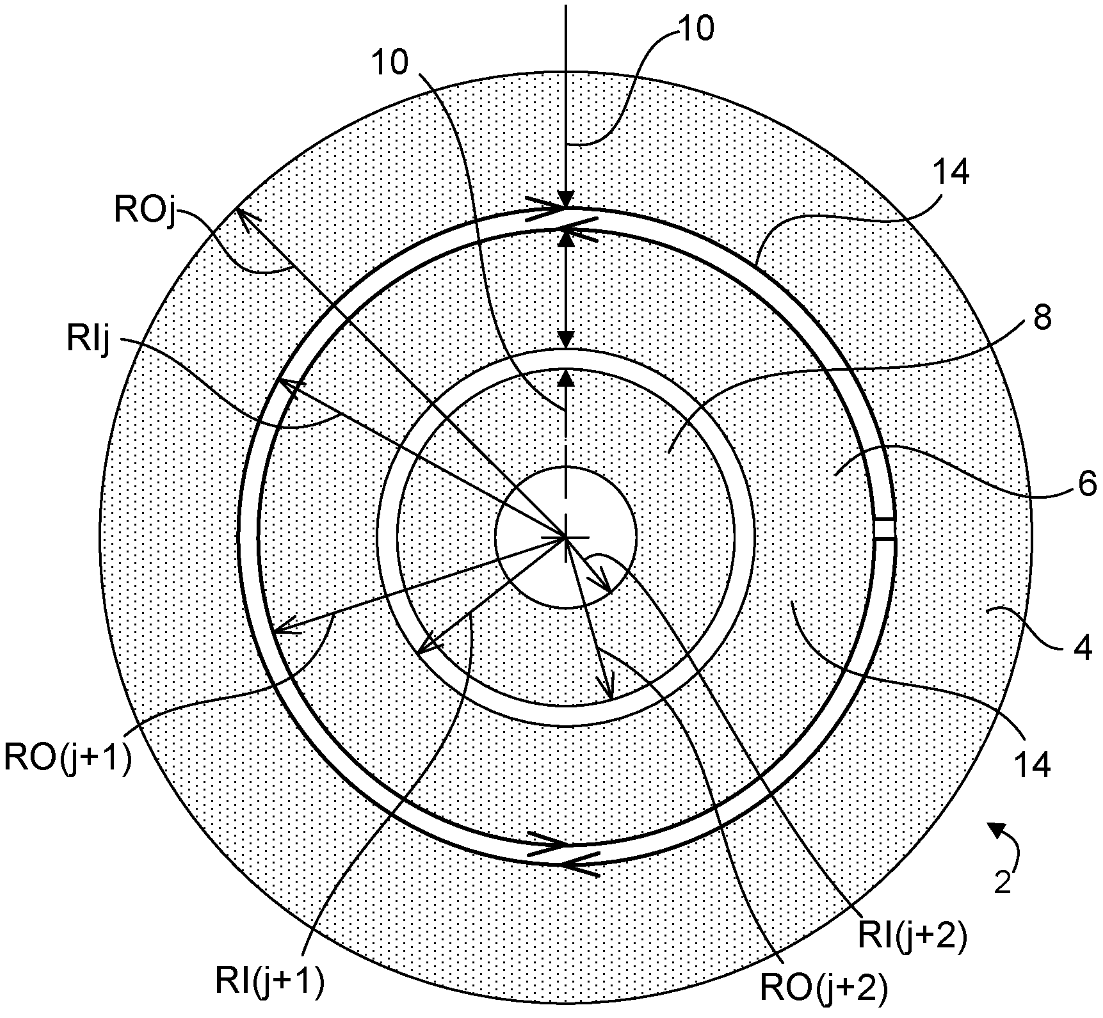
FIG. 9 is a top view of an inductor according to one embodiment of the present inductor, depicting an inductor without windings.
Figure 10:
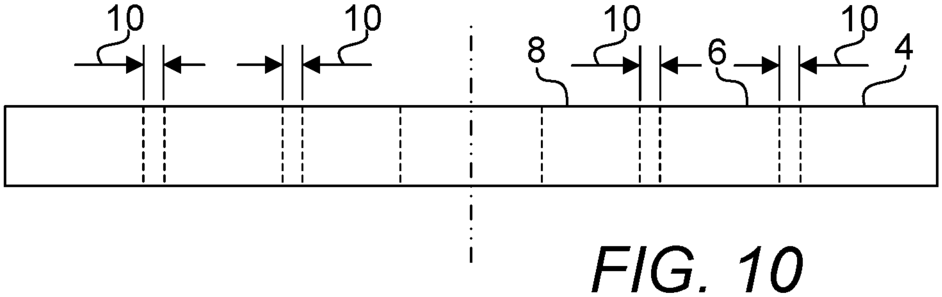
FIG. 10 is a side partially transparent view of an inductor according to one embodiment of the present inductor, depicting the inductor without windings.

FIG. 9 is a top view of an inductor 2 according to one embodiment of the present inductor, depicting the inductor without windings. FIG. 10 is a side partially transparent view of an inductor 2 according to one embodiment of the present inductor, depicting the inductor without windings. Three cores, i.e., a first core 4, a second core 6 nested in the first core 4 and a third core 8 nested in the second core 6 are provided. Each core 4, 6, 8 is a toroid where the toroid annular shape is substantially defined by an object generated by revolving a plane geometrical figure about an axis external to that figure which is parallel to the plane of the figure and does not intersect the figure.

In one embodiment, the cross-sectional shape of each exposed end of each toroid if dissected with a plane coplanar to the central axis of each toroid, is a circle. In another embodiment, such shape is a rectangle. Each core is separated from its adjacent core with a slotwidth 10. For ease of ensuing discussions, for enclosed core inductors, j, $R_{Ij}$ and $R_{Oj}$ are defined as the referenced core, the inner radius of core j and the outer radius of core j, respectively. Note that, instead of referencing a winding window as in the case of an enclosed winding inductor, j now references a core. Again, each core is constructed from a magnetically permeable material.

Figure 11:
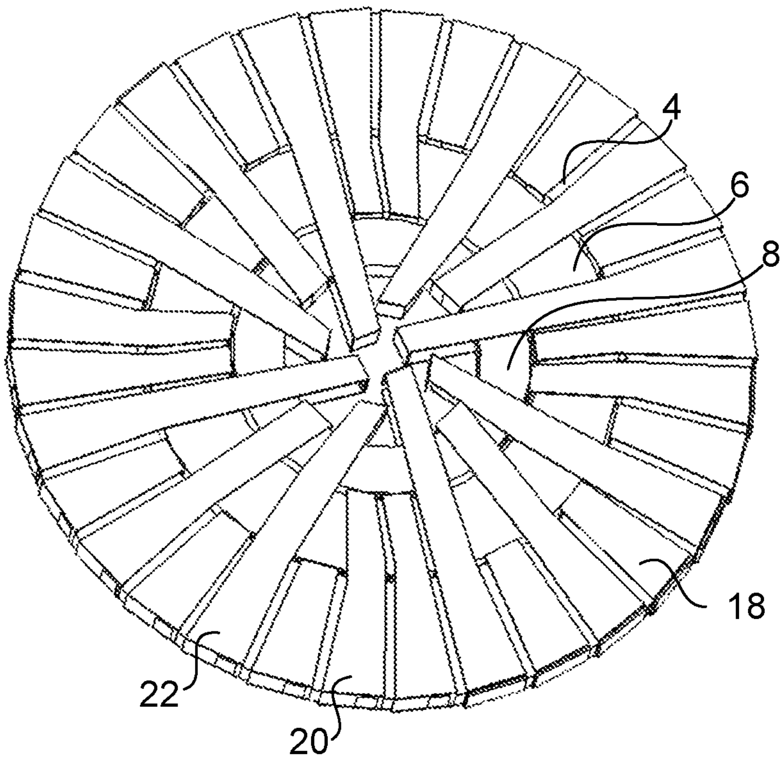
FIG. 11 is a top view of an inductor according to one embodiment of the present inductor, depicting the inductor with windings.
Figure 12:
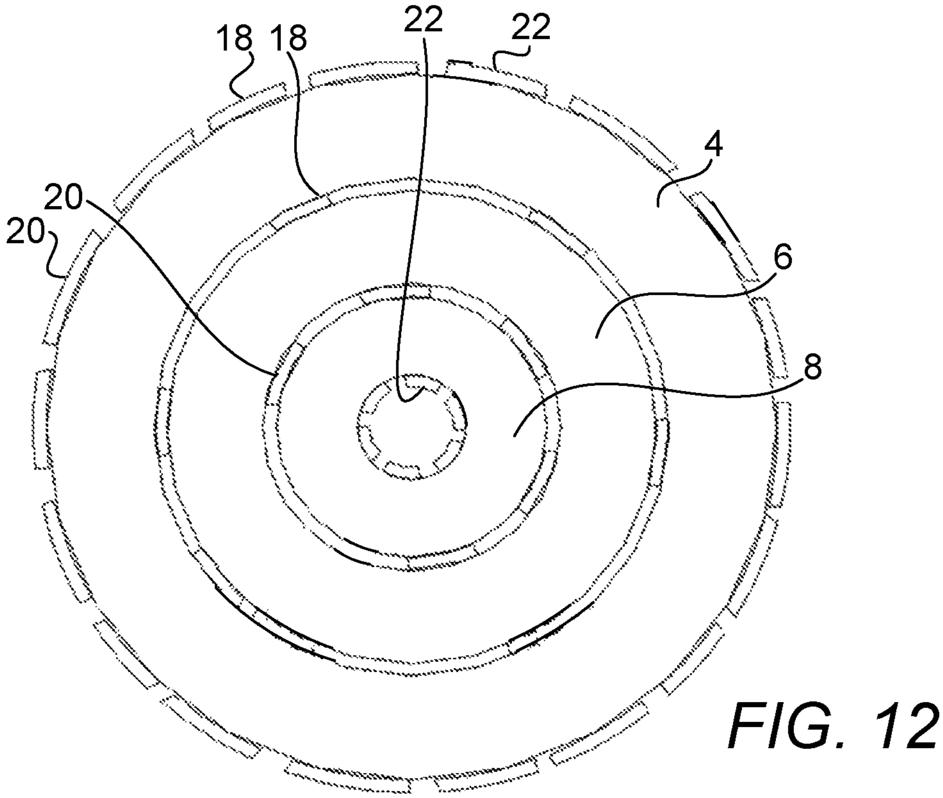
FIG. 12 is a top view of an inductor according to one embodiment of the present inductor, depicting the windings through various cores.

FIG. 11 is a top view of an inductor 2 according to one embodiment of the present inductor, depicting the inductor with windings. FIG. 12 is a top view of an inductor according to one embodiment of the present inductor, depicting the windings through various cores with portions of the winding removed to reveal only the portions disposed through slot-widths and over the outer radius of the first core 4. In this embodiment, the winding is applied to and encompassing all three cores 4, 6, 8. In doing so, note that some winding portions 18 are wrapped around the first core 4 only, some winding portions 20 are wrapped around the first and second cores 4, 6 and yet some windings 22 around all three cores 4, 6, 8.

Figure 13:
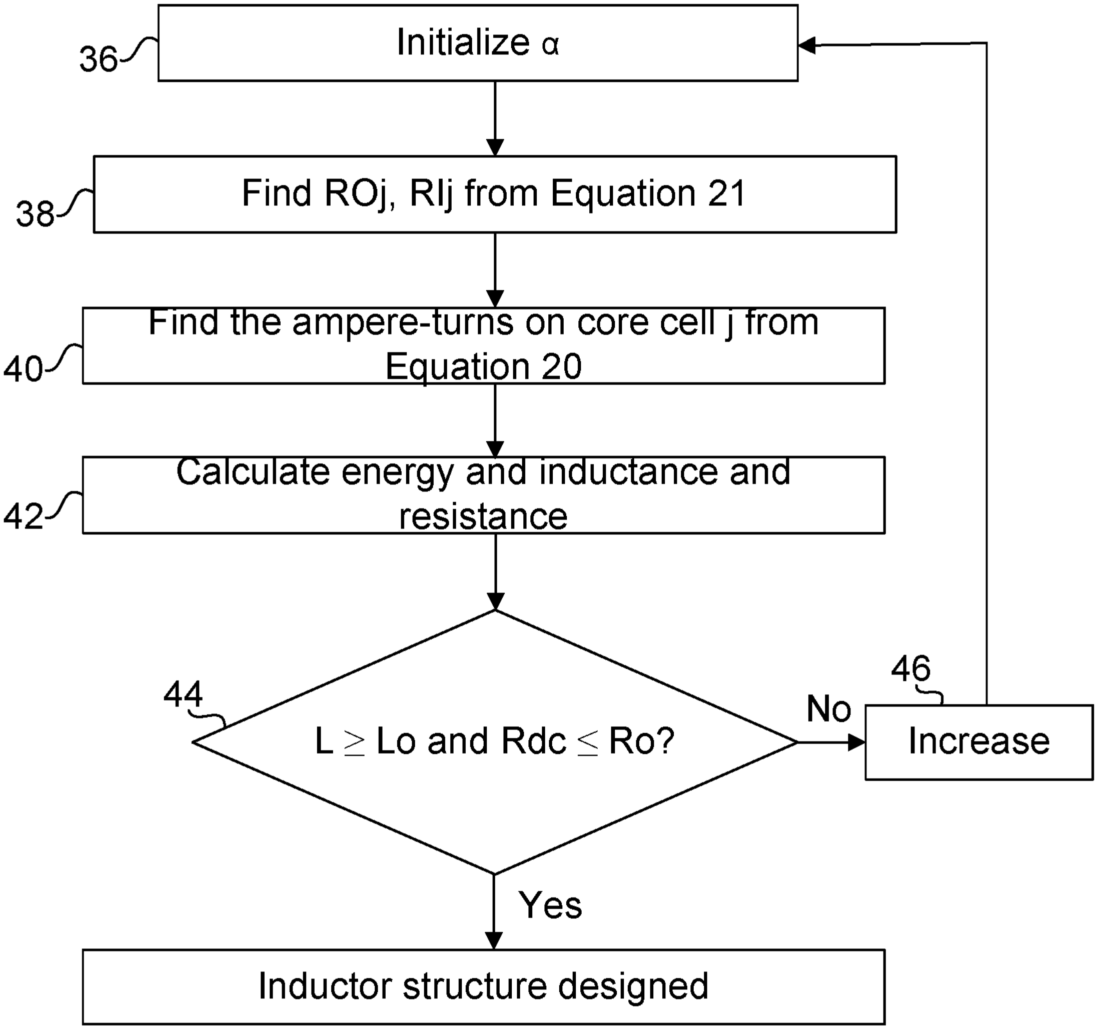
FIG. 13 is a flowchart depicting the steps by which the enclosed core type of the present inductor is configured.

FIG. 13 is a flowchart depicting the steps by which the enclosed core type of the present inductor is configured. First, the uniformity factor α is initialized at 0.5, which is the minimal value to maintain the benefit of a balanced field as shown in step 36. The geometrical parameters of the cores, e.g., the footprint radius and thickness of a core are determined. Based on the uniformity factor α initialized in step 36, the outer radius $R_{Oj}$ of core j and the inner radius $R_{Ij}$ of the core j are determined as in step 38 from equation E21. The ampere-turns is then determined as in step 40 using equation E20. The ampere-turns (NI) between $R_{Oj}$ and $R_{O(j+1)}$ is determined using equation E20:

$$NI=\alpha_j H_{max} 2\pi(R_{oj}-R_{o(j+1)}) \quad \text{Equation E20:}$$

Where j=core, $R_{Oj}$=outer radius of the core j, $R_{O(j+1)}$= outer radius of the core inside of the core (j+1), NI=ampere-turns, N=number of turns of core j, I=current rating, $\alpha_j$=uniformity factor of core j and $H_{max}$=maximum magnetic field. The magnetic field reaches its maximum value at the inner radius $R_{Ij}$ of a core j.

The stored energy E, inductance L and resistance $R_{dc}$ of the core can then be calculated as in step 42. If the E, L and $R_{dc}$ of the core do not meet desired values as determined in step 44, the uniformity factor α is increased and this iterative process continues until the calculated E, L and $R_{dc}$ meet the desired values where $L_o$ is the desired inductance and $R_o$ is the desired resistance.

$$R_{Oj}/R_{Ij}=1/\alpha \quad \text{Equation E21:}$$

Where j=core, $R_{Oj}$=outer radius of core j, $R_{Ij}$=inner radius of core j and α=uniformity factor.

Inductance L is calculated as in Equation E22.

$$L=\sum_{j=1}^{ncell}\frac{\mu*h}{2\pi}*\left[N_j^2*\ln\left(\frac{R_j\max}{R_j\min}\right)\right] \quad \text{Equation E22}$$

Where j=core, h=core height, ncell=total number of cores, Nj=total number of turns enclosed by cell j, $R_j$ max=outer radius of core j, $R_j$ min=inner radius of core j and μ=permeability of core material.

Resistance $R_{dc}$ is calculated as in Equation E23:

$$R_{dc}=(\rho*\text{length})/\text{area} \quad \text{Equation 23:}$$

Where ρ=resistivity of winding, length=total length of winding, area=cross-sectional area of winding=width*thickness, where width=(2*π*$R_{ncell}$ min)/ $N_{ncell}$, $N_{ncell}$=Number of turns enclosing ncell and $R_{ncell}$ min=inner radius of ncell.

As the uniformity factor α represents the uniformity level throughout the magnetic field in a balanced field design, a relatively large uniformity factor is always preferred. For a given volume, an optimal uniformity factor always exists that gives the highest time constant. The optimal value of uniformity factor varies with different situations and input parameters such as the footprint and height of the inductor. However, the uniformity factor cannot always be ideally selected as it is usually limited by the fabrication constraints. The plate thickness, for example, which is defined as $H_p$ and calculated from equations E2-E6, decreases as a increases since thinner plates are needed to increase the flux density. The plate thickness for each core is minimized as much as possible but within fabrication limitations. Therefore, the uniformity factor can only be as close to unity as fabrication limitations permit.

To further generalize the aforementioned inductor design methods to broaden the spectrum of applications, a normalization method based on radius $R_c$, or the like, can be applied. For example, the required inductance, volume, and resistance are given as inputs to the design procedure described elsewhere herein, and the winding distributions are design outputs that ensure balanced field inside the core. To make the design procedure for both types of inductors (enclosed-core and enclosed-winding) more generalized and applicable to a wide range of dimensions, all the geometrical factors can be normalized to the footprint radius $R_c$ so that they become dimensionless. The design output can be scaled up or down to the desired values.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A method of constructing a compact balanced field enclosed winding inductor having a desired inductance $L_o$ and a desired resistance $R_o$, a plurality of winding windows of the compact balanced field enclosed winding inductor comprising at least a first winding window and a second winding window, and an enclosed core constructed from magnetically permeable materials, wherein the enclosed core is comprised of a plurality of nested cores, said method comprising:

(a) predetermining a uniformity factor α of the compact balanced field enclosed winding inductor to a minimal value sufficient to maintain a benefit of a balanced field;

(b) determining a plate thickness $H_p$, an outer radius of the first winding window $R_{O1}$, an inner radius of the first winding window $R_{I1}$, and an outer radius of the second winding window $R_{O2}$ of the compact balanced field enclosed winding inductor;

(c) determining radii of remaining winding windows of the plurality of winding windows of the compact balanced field enclosed winding inductor recursively, wherein the radii are limited by manufacturing constraints;

(d) determining a number of turns $n_j$ of each of the plurality of winding windows of the compact balanced field enclosed winding inductor;

(e) determining an inductance L and a resistance $R_{dc}$ of the compact balanced field enclosed winding inductor based on the number of turns $n_j$ of each of the plurality of winding windows;

(f) increasing the uniformity factor α and repeating steps (b)-(e) if the inductance L is not greater than or equal to the desired inductance $L_o$ and the resistance is not less than or equal to the desired resistance $R_o$; and (g) fabricating the compact balanced field enclosed winding inductor having the plate thickness $H_p$, the radii of the winding windows, the number of turns $n_j$, the inductance L, and the resistance $R_{dc}$.

2. The method according to claim 1, wherein the fabricating uses at least one of a routing process, a laser process on a core, an etching technique on copper, and screen printing with silver paste.

3. The method according to claim 1, wherein the manufacturing constraints comprise a width of a winding for the compact balanced field enclosed winding inductor and a distance between the winding and a center of a core.

4. The method according to claim 1, wherein the predetermined uniformity factor is selected according to a given set of input parameters, wherein the parameters are selected from one or more of an inductor footprint, a thickness of the inductor, a permeability of a magnetic material, and a highest flux density allowed from a core loss limitation.

5. A method of constructing a compact balanced field enclosed winding inductor having a desired inductance $L_o$ and a desired resistance $R_o$, a plurality of winding windows of the compact balanced field enclosed winding inductor comprising at least a first winding window and a second winding window, said method comprising:

(a) predetermining a uniformity factor α of the compact balanced field enclosed winding inductor to a minimal value sufficient to maintain a benefit of a balanced field;

(b) determining a plate thickness $H_p$, an outer radius of the first winding window $R_{O1}$, an inner radius of the first winding window $R_{I1}$, and an outer radius of the second winding window $R_{O2}$ of the compact balanced field enclosed winding inductor;

(c) determining radii of remaining winding windows of the plurality of winding windows of the compact balanced field enclosed winding inductor recursively, wherein the radii are limited by manufacturing constraints;

(d) determining a number of turns $n_j$ of each of the plurality of winding windows of the compact balanced field enclosed winding inductor;

(e) determining an inductance L and a resistance $R_{dc}$ of the compact balanced field enclosed winding inductor based on the number of turns $n_j$ of each of the plurality of winding windows;

(f) increasing the uniformity factor α and repeating steps (b)-(e) if the inductance L is not greater than or equal to the desired inductance $L_o$ and the resistance is not less than or equal to the desired resistance $R_o$; and (g) fabricating an enclosed core and a winding for the compact balanced field enclosed winding inductor having the plate thickness $H_p$, the radii of the winding windows, the number of turns $n_j$, the inductance L, and the resistance $R_{dc}$, wherein:

the uniformity factor α is 0.5 in step (a), the enclosed core has a relative permeability of about 22, and the windings are formed from copper sheets having a thickness of about 0.5 mm.

6. The method according to claim 5, wherein the manufacturing constraints comprise a width of a winding for the compact balanced field enclosed winding inductor and a distance between the winding and a center of the core.

7. The method according to claim 5, wherein the predetermined uniformity factor is selected according to a set of input parameters, the set of input parameters comprising one or more of an inductor footprint, an inductor thickness, a permeability of a magnetic material, and a highest flux density allowed from a core loss limitation.

* * * * *